United States Patent [19]
Hayner et al.

[11] Patent Number: 5,622,475
[45] Date of Patent: Apr. 22, 1997

[54] DOUBLE RABBET ROTOR BLADE RETENTION ASSEMBLY

[75] Inventors: Denis R. Hayner, Newburyport; Peter J. Rock, Byfield, both of Mass.

[73] Assignee: General Electric Company, Cincinnati, Ohio

[21] Appl. No.: 581,824

[22] Filed: Jan. 2, 1996

Related U.S. Application Data

[62] Division of Ser. No. 298,019, Aug. 30, 1994, abandoned.

[51] Int. Cl.⁶ .................................................. F01D 5/30
[52] U.S. Cl. .................................. 416/220 R; 416/219 R
[58] Field of Search ........................ 416/96 R, 219 R, 416/220 R

[56] References Cited

U.S. PATENT DOCUMENTS

| | | | |
|---|---|---|---|
| 3,768,924 | 10/1973 | Corsmeier et al. | 416/220 R |
| 4,558,988 | 12/1985 | Kisling et al. | 416/220 R |
| 5,478,207 | 12/1995 | Stec | 416/219 R |
| 5,503,528 | 4/1996 | Glezer et al. | 416/96 R |

Primary Examiner—Edward K. Look
Assistant Examiner—Mark Sgantzos
Attorney, Agent, or Firm—Andrew C. Hess; Wayne O. Traynham

[57] ABSTRACT

A turbine rotor assembly includes a rotor disk, rotor blades joined thereto, and a blade retention plate for axially retaining the blades on the disk. The disk includes an outer rim, an inner hub, and an annular web extending therebetween. An axial extension extends from the web and is spaced radially below a corner of the rim. The blades have dovetails axially disposed in respective dovetail slots in the disk rim. The retention plate includes an outer rim which abuts the disk rim and blade dovetails, an inner hub, and a web extending therebetween. The plate hub has an outer rabbet disposed in abutting contact with the rim corner, and an inner rabbet radially adjoining the axial extension for maintaining abutting contact therewith upon differential radial contraction between the retention plate and the disk which separates the outer rabbet from the rim corner. In one embodiment, the assembly further includes a locking ring disposed between the retention plate and the axial extension for axially trapping the plate adjacent to the disk rim.

10 Claims, 3 Drawing Sheets

5,622,475

1
DOUBLE RABBET ROTOR BLADE RETENTION ASSEMBLY

The US Government has rights in this invention in accordance with Contract No. N00019-91-C-0114 awarded by the Department of the Navy.

This is a divisional of application Ser. No. 08/298,019 filed on Aug. 30, 1994 now abandoned.

BACKGROUND OF THE INVENTION

The present invention relates generally to gas turbine engines, and, more specifically, to boltless blade retainers in turbine rotor assemblies.

In a dual rotor gas turbine engine, a low pressure compressor or fan is driven by a low pressure turbine (LPT), and a high pressure compressor is driven by a high pressure turbine (HPT). Air is compressed in turn through the compressors and mixed with fuel and ignited in a combustor for generating combustion gases which flow downstream through the turbines which extract energy therefrom. Each turbine includes one or more stages of turbine nozzles and rotor blades. Each turbine nozzle includes a plurality of circumferentially spaced apart stator vanes which direct the combustion gases across respective rows of turbine blades. The turbine blades are mounted to the rim of a rotor disk using conventional circumferential entry or axial entry dovetails in corresponding slots in the rims of the rotor disks.

In the axial entry blade mounting design, the blade dovetails are inserted axially during assembly into corresponding axially extending dovetail slots in the disk rims. In order to axially retain the blades therein during operation, conventional blade retainers in the form of annular plates are provided at both the forward and aft ends of the disk in abutting contact therewith for axially trapping the blades. In early designs, the blade retainers were bolted to the rotor disks and therefore created undesirable effects such as stress concentration at the bolt holes. In typical modern designs, boltless blade retainers are used wherein a separate locking ring may be used to trap the blade retainers against axial movement thereof. Boltless blade retainers provide improvements in reduction of weight and windage losses, and most significantly eliminate the stress concentrations of the older design bolt holes.

Since turbine blades are typically cooled with a portion of compressed air bled from the engine compressor, the forward or upstream blade retainer typically includes a plurality of circumferentially spaced apart cooling air feed holes therethrough which channel the cooling air into the rim of the disk from which it is further channeled through the individual blades for cooling the airfoils thereof in a conventional manner. In this arrangement, the blade retainer is also referred to as a cooling plate and typically includes an annular seal wire disposed between the retainer and the disk rim for sealing the interface therebetween for channeling the cooling air through the disk rim without undesirable flow leakage.

Since the blade retainer is a discrete component which rotates with the rotor disk at relatively high rotational speeds during operation, it is suitably balanced for reducing or eliminating undesirable vibration therefrom. In a typical design, the blade retainer includes a radially inner hub having a radially outer diameter rabbet which engages a corresponding inner surface at a corner of the disk rim for preventing radial outward movement of the blade retainer. The outer rabbet is typically provided with a suitable interference fit with the rim corner for maintaining contact therewith under various operating conditions of rotational speed and thermal expansion and contraction.

More specifically, the rotor disk has relatively high mass compared to the blade retainer, with the blade retainer therefore thermally responding more quickly than the rotor disk due to the varying temperatures encountered during operation. In a speed burst for example, the rotor disk is accelerated up in speed, with the blade retainer being heated faster than the rotor disk. Accordingly centrifugal force and differential thermal expansion between the two components ensures that the outer rabbet is tightly maintained in contact with the rim corner for maintaining the originally provided balance.

However, during a speed chop in which the rotor disk is decelerated to a lower speed, the corresponding centrifugal force is reduced and, the blade retainer cools faster than the rotor disk which causes the blade retainer to contract at a greater rate than that of the disk. If insufficient initial interference fit and centrifugal force occur, the differential thermal contraction between the outer rabbet and the corresponding rim corner will cause radial separation or liftoff therebetween. In such an event the blade retainer would be allowed to move eccentrically causing rotor imbalance and undesirable vibrations. Furthermore, axial seal wire liftoff can also accompany radial rabbet liftoff causing undesirable cooling air leakage.

Since HPTs operate at greater speeds than LPTs, boltless blade retainers are typically found in the former but not in the latter. Rabbet liftoff can be avoided in designs that (1) have sufficiently high operational speeds with correspondingly high centrifugal loads; (2) use a blade retainer operated at conditions where the disk constrains and limits the retainer's radial deflection below that which it would achieve if operated off the disk; and (3) avoid use of the cooling air feed holes (when holes are implemented) which tend to separate the thermal response times of the blade retainer and the rotor disk. The high speed operating characteristics of the HPT provide a suitable environment for the implementation of boltless blade retaining cooling plates in which rabbet liftoff as well as seal wire liftoff are prevented as is conventionally known. As indicated above, rabbet liftoff leads to eccentric imbalance operation, with seal wire liftoff providing undesirable leakage of the cooling air from its intended flowpath.

Since LPTs operate at substantially lower speeds than HPTs, boltless blade retainers are typically not found therein. The use of a conventional boltless blade retainer in a typical LPT can result in the low operating speeds of the LPT locating the blade retainer in operating conditions which limit the ability to maintain contact between the outer rabbet and the rim corner. Since the blade retainer is generally capable of supporting itself at these conditions, the desired rabbet contact between the disk and the blade retainer is difficult to maintain. The relatively low centrifugal loads associated with a typical LPT idle speed are usually not enough to overcome the thermal contraction difference during the transient speed chop thus leading to separation of the outer rabbet and the disk rim causing imbalance, as well as undesirable seal wire liftoff. Rabbet liftoff is worsened when the blade retainer includes the cooling air feed holes. Accordingly, LPT blade retainer designs typically use bolted configurations in view of these operational considerations.

SUMMARY OF THE INVENTION

A turbine rotor assembly includes a rotor disk, rotor blades joined thereto, and a blade retention plate for axially retaining the blades on the disk. The disk includes an outer rim, an inner hub, and an annular web extending therebetween. An axial extension extends from the web and is spaced radially below a corner of the rim. The blades have dovetails axially disposed in respective dovetail slots in the disk rim. The retention plate includes an outer rim which abuts the disk rim and blade dovetails, an inner hub, and a web extending therebetween. The plate hub has an outer rabbet disposed in abutting contact with the rim corner, and an inner rabbet radially adjoining the axial extension for maintaining abutting contact therewith upon differential radial contraction between the retention plate and the disk which separates the outer rabbet from the rim corner. In one embodiment, the assembly further includes a locking ring disposed between the retention plate and the axial extension for axially trapping the plate adjacent to the disk rim.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
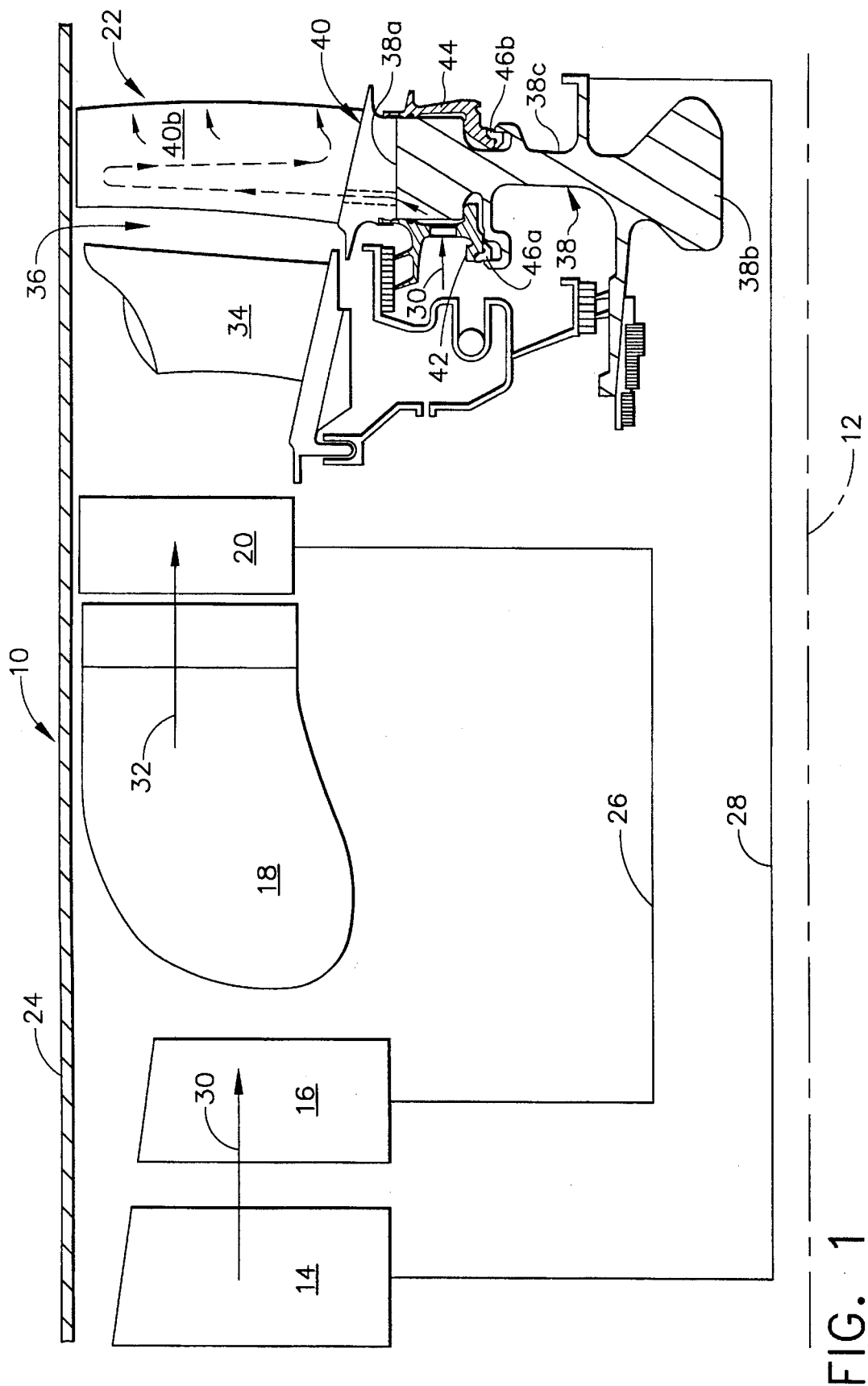
FIG. 1 is a schematic elevational view of a portion of an exemplary dual rotor gas turbine engine including an LPT rotor disk having a boltless blade retainer in accordance with one embodiment of the present invention.

Illustrated schematically in FIG. 1 is an exemplary aircraft gas turbine engine 10 which includes in serial flow communication about a longitudinal or axial centerline axis 12 a fan or low pressure compressor (LPC) 14, a high pressure compressor (HPC) 16, a combustor 18, and a high pressure turbine (HPT) 20, all of which are conventional in structure and operation. Disposed downstream of the HPT 20 is a low pressure turbine (LPT) 22 in accordance with an exemplary embodiment of the present invention.

The several components of the engine 10 are contained within an annular outer casing 24, with the HPC 16 being joined to the HPT 20 by a first drive shaft 26, and the fan 14 being joined to the LPT 22 by a second drive shaft 28 for operation in a conventional manner. Ambient air is compressed in turn in the fan 14 and HPC 16 to provide compressed air 30 to the combustor 18 wherein it is conventionally mixed with fuel and ignited for generating hot combustion gases 32 which flow downstream in turn through the HPT 20 and the LPT 22 which extract energy therefrom for driving the compressors 14, 16.

The LPT 22 includes a conventional nozzle 34 having a plurality of circumferentially spaced apart stator vanes which channel the combustion gases 32 downstream through a corresponding LPT rotor stage or assembly 36 configured in accordance with one embodiment of the present invention.

More specifically, the rotor assembly 36 includes a rotor disk 38 which supports a plurality of circumferentially spaced apart rotor blades 40 which are axially retained therein by a first or forward blade retention plate 42 and an opposite second or aft blade retention plate 44. In the exemplary embodiment illustrated in FIG. 1, the forward retention plate 42 includes a first split locking ring 46a which axially traps the forward plate 42 against the disk 38 as described in more detail below, with the aft plate 44 similarly including a second split locking ring 46b for axially trapping the aft plate 44 against the disk 38 in a conventional configuration.

Figure 2:
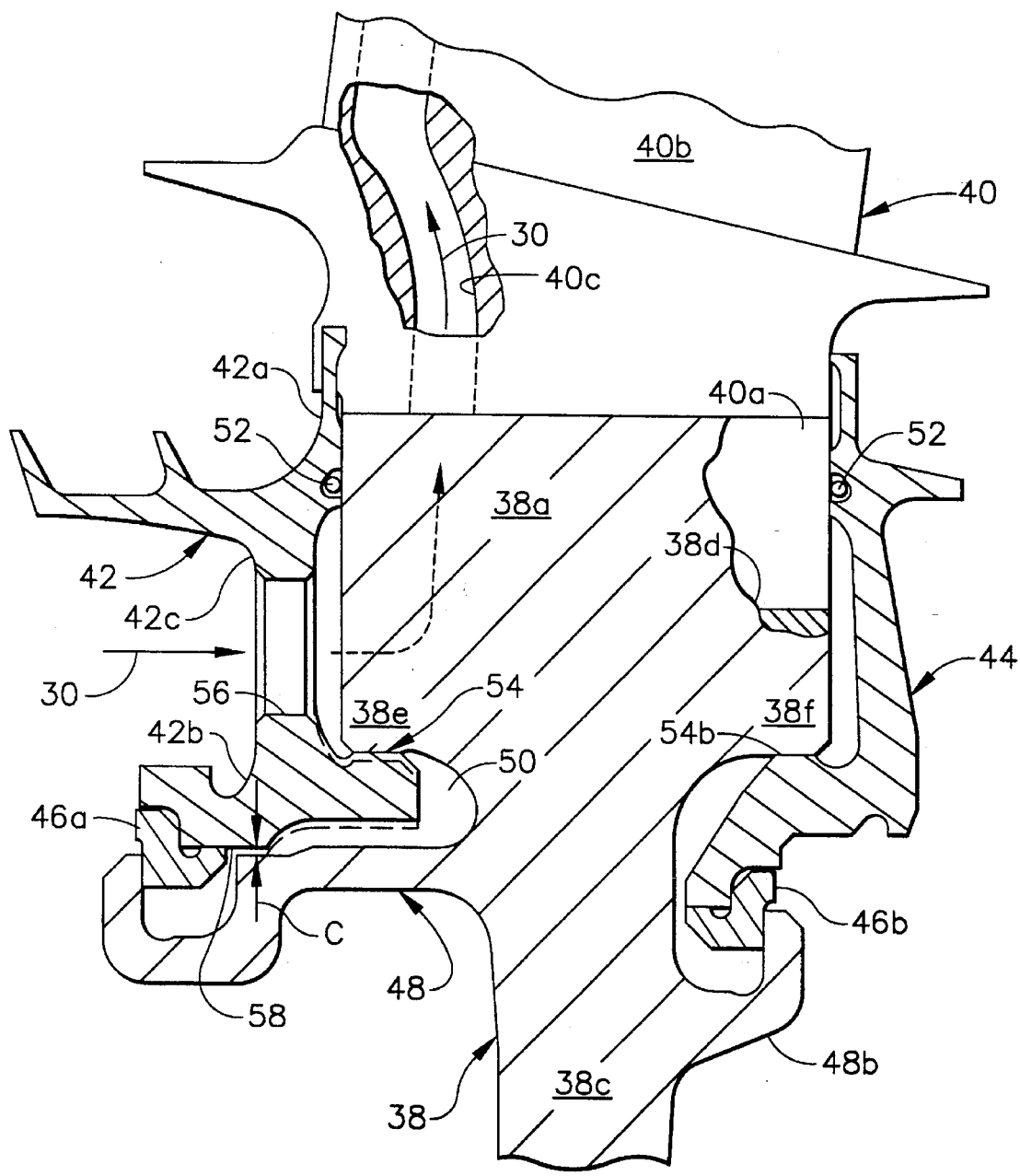
FIG. 2 is an enlarged, partly sectional view of a portion of the LPT rotor disk and cooperating boltless blade retainer having outer and inner rabbets in accordance with one embodiment of the present invention.

The disk 38 illustrated in FIG. 1 includes a radially outer rim 38a which is integrally joined to a radially inner hub 38b by a narrower annular web 38c extending radially therebetween. FIG. 2 illustrates in more particularity the rim region of the disk 38 and adjoining forward and aft retention plates 42 and 44. The disk rim 38a includes a plurality of circumferentially spaced apart, axially extending dovetail slots 38d which are open radially outwardly in a conventionally known manner. Each of the blades 40 is conventional and includes a radially inner, axial entry dovetail 40a, and a radially outwardly extending airfoil 40b. The blade dovetails 40a are complementary to and axially disposed in respective ones of the dovetail slots 38d for radially retaining the blades 40 in the disk 38.

In accordance with the present invention, the rotor disk 38 illustrated in FIG. 2 further includes an annular first or forward axial extension 48 extending integrally from the top of the web 38c in the axially forward direction, and is spaced radially below a first or forward lower corner 38e of the rim 38a to define therewith a first or forward face cavity 50 therebetween.

The forward retention plate 42 includes a radially outer rim 42a integrally joined with a radially inner hub 42b by an annular web 42c extending radially therebetween. The plate rim 42a may take any conventional form including labyrinth seal teeth as shown at its forward end, and a circumferential recess in its aft face for receiving a conventional annular seal wire 52 therein. The plate rim 42a is configured to abut the forward face of the disk rim 38a and the blade dovetails 40a for axially retaining the blades 40 in the disk 38 on the forward side thereof.

In the embodiment shown in FIG. 2, the plate inner hub 42b has an aft portion that includes a radially outwardly facing outer rabbet 54 which is disposed in abutting contact with the inner surface of the forward corner 38e, with this aft portion of the inner hub 42b being disposed at least in part in the forward cavity 50.

Also in the exemplary embodiment illustrated in FIG. 2, the forward plate web 42c includes a plurality of circumferentially spaced apart feed holes 56 for channeling a portion of the compressed air 30 bled from one of the compressors as bleed cooling air which conventionally flows into the disk rim 38a for flow through conventional cooling channels 40c provided in the airfoils 40b for cooling thereof.

As indicated above in the background section, providing a boltless blade retainer in a relatively low speed LPT is ordinarily not done due to the liftoff concerns of the outer rabbet 54 and of the seal wire 52 during a transient speed deceleration chop in particular. In the speed chop operation of the engine, the cooling air 30 causes the forward plate 42 to thermally contract at a greater rate than the thermal contraction of the disk 38. This can result in radial liftoff or the creation of a radial gap between the outer rabbet 54 and the forward corner 38e, as well as axial liftoff or separation of the seal wire 52 as the plate rim 42a is displaced away from the disk rim 38a. The centrifugal force generated by rotation of the disk 38, especially at low rotor speeds such as idle, are typically insufficient for maintaining contact between the outer rabbet 54 and the rim corner 38e. Of course, during high speed operation of the LPT disk rotor 38 and during acceleration bursts thereof, centrifugal force is increased for maintaining contact between the outer rabbet 54 and the rim corner 38e, with thermal expansion of the forward plate 42 greater than thermal expansion of the disk 38 being effective for further maintaining the outer rabbet 54 and the rim corner 38e in contact.

In accordance with one object of the present invention, transient liftoff of the outer rabbet 54 from the rim corner 38e may be accommodated by providing a radially inwardly facing inner rabbet 58, as shown in FIG. 2, which radially adjoins the forward extension 48 for maintaining abutting contact therewith upon differential radial contraction between the forward plate 42 and the disk 38 which radially separates the outer rabbet 54 from the rim corner 38e. As the forward plate 42 radially contracts more than the contraction of the disk 38, the inner rabbet 58 engages the forward extension 48 for maintaining concentric alignment between the forward plate 42 and the disk 38 to prevent eccentric movement therebetween and maintain balance for preventing undesirable vibration.

In the exemplary embodiment illustrated in FIG. 2, the outer rabbet 54 abuts the rim corner 38e in an initial interference fit of about 2 mils (0.05 mm). Although the inner rabbet 58 could also be disposed in an interference fit with the forward extension 48, this is not necessary and would undesirably increase the required axial force for initially assembling the forward plate 42 against the disk 38. In a preferred embodiment, the inner rabbet 58 is initially spaced radially above the forward extension 48 to define an initial, predetermined clearance C therebetween. The clearance is preferably lower in magnitude than the extent of the interference fit, e.g. 1 mil being less than 2 mils. In this way, at least one of the outer or inner rabbets 54, 58 is likely to be maintained in abutting contact with the respective rim corner 38e or forward extension 48 during all operating conditions of the engine.

In the exemplary embodiment illustrated in FIG. 2, the aft portion of the plate hub 42b is generally cylindrical and defines the outer rabbet 54. The forward portion of the plate hub 42b may have any suitable conventional configuration for cooperating with the forward locking ring 46a, with the inner rabbet 58 being suitably located between the forward and aft hub portions. For example, the inner rabbet 58 is disposed outboard or axially forward of the outer rabbet 54, with the locking ring 46a being disposed outboard of the plate web 42c. The inner rabbet 58 is also disposed in part outboard of the plate web 42c so that abutting contact of the inner rabbet 58 and the forward extension 48, during the transient chop condition for example, effects a clockwise moment in the section illustrated in FIG. 2 to help maintain the plate rim 42a and seal wire 52 in abutting contact with the disk rim 38a to restrain axial liftoff therebetween.

The locking ring 46a preferably has a general L-shape cross section, and the forward end of the forward extension 48 is generally U-shaped for initially receiving the locking ring 46a in a radially contracted position, with radial expansion thereof providing axial abutting contact in turn between the forward end of the forward extension 48, the locking ring 46a, and the forward portion of the plate hub 42b in a conventional arrangement. The intermediate portion of the forward extension 48 includes a suitable annular land against which the inner rabbet 58 may abut during the transient chop, which is shown in phantom line in FIG. 2.

Furthermore, the forward extension 48 is generally cylindrical and relatively thin for providing radial flexibility for attenuating transient loads developed with the forward plate 42 in the differential radial contraction between the disk 38 and the forward plate 42 during the transient chop. In this way, the stress generated in the forward plate 42 and the forward extension 48, during the transient chop as an increasing interference fit is developed, is reduced or attenuated from what it otherwise might be if a relatively stiff forward extension 48 were provided.

Since the feed holes 56 found in the forward retention plate 42 substantially increase radial liftoff of the outer rabbet 54 during the transient chop, the addition of the inner rabbet 58 is a relatively simple and compact solution for ensuring concentric rotation of the forward plate 42 together with the disk 38 to prevent undesirable vibration. Since the aft retention plate 44 does not include cooling air feed holes therethrough, the potential for undesirable liftoff between an analogous outer rabbet 54b and cooperating aft inner corner 38f of the disk rim 38a is reduced. Accordingly, the aft retention plate 44 may take any suitable conventional boltless configuration such as that shown including a second split locking ring 46b substantially identical to the first locking ring 46a, which cooperates with a suitably configured aft axial web extension 48b. However, in the event that radial liftoff of the outer rabbet 54b is a concern during the transient chop operation of the engine, the aft retention plate 44 may be similarly configured like the forward retention plate 42 to provide a corresponding inner rabbet 58, with a suitably modified aft extension 48b for providing abutment therewith.

Figure 3:
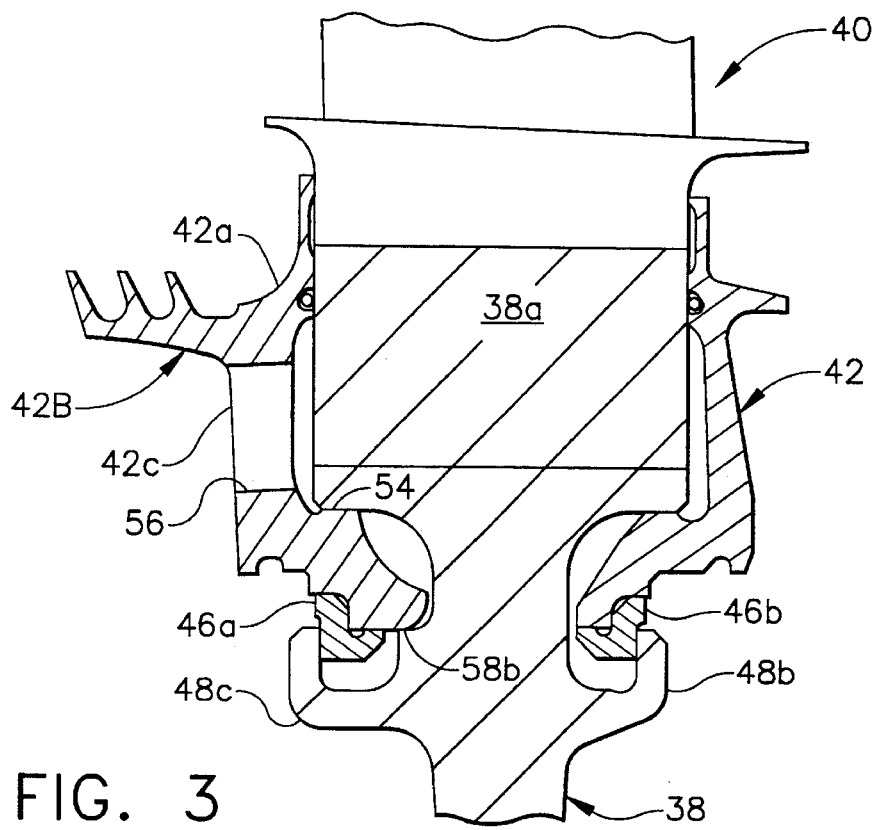
FIG. 3 is a partly sectional elevational view of a portion of the rotor disk illustrated in FIG. 2 including a boltless blade retainer in accordance with a second embodiment of the present invention.

The provision of both outer and inner rabbets in a boltless blade retention plate design may be provided in various configurations. FIG. 3 illustrates a second embodiment of the forward retention plate designated 42B in which the entire plate inner hub extends inboard into the corresponding cavity defined by the relatively shorter forward axial extension 48c. The inner rabbet 58b is disposed inboard of the outer rabbet 54, with the first locking ring 46a being disposed inboard of the web 42c of the plate 42B. The plate hub itself extends axially to the inner rabbet 58b at its axially inboard end, with load attenuation being otherwise provided by suitable flexing of the plate hub and web.

Figure 4:
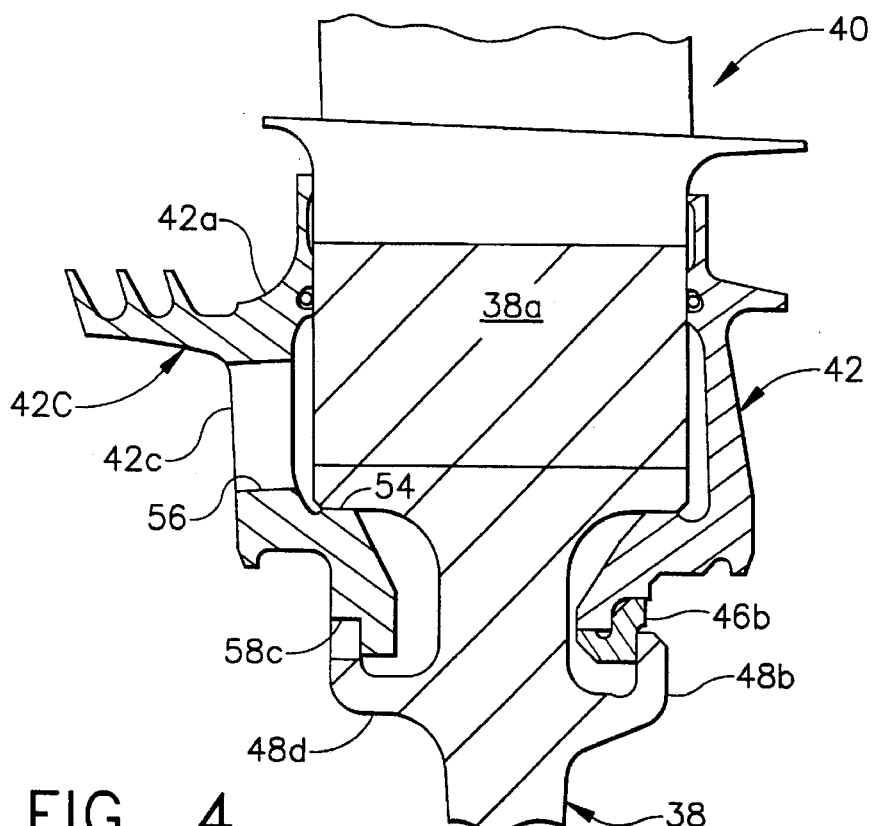
FIG. 4 is a partly sectional elevational view of a portion of the rotor disk illustrated in FIG. 2 including a boltless blade retainer in accordance with a third embodiment of the present invention.

FIG. 4 illustrates a third embodiment of the forward retention plate designated 42C which does not use a separate locking ring such as ring 46a, but instead configures the plate hub in an otherwise conventional bayonet mount for removably joining together the hub of the plate 42C and the cooperating forward axial extension 48d. A typical bayonet mount includes a plurality of circumferentially spaced apart, generally square tabs at the radially outer end of the forward extension 48d which cooperate with corresponding tabs at the radially inner, and inboard, end of the forward retention plate 42C. During assembly, the corresponding teeth are aligned with the adjacent recesses for allowing the retention plate 42C to be axially inserted therebetween, with the plate 42C then being rotated circumferentially for axially aligning together the corresponding tabs and preventing axial disassembly thereof. In this embodiment, the inner rabbet 58c is in the form of an annular land disposed radially above the bayonet tabs of the forward extension 48d against which the land abuts during the transient chop operation of the engine.

In the various embodiments disclosed above, the relatively close proximity of the outer and inner rabbets provides a relatively compact blade retention arrangement having correspondingly low weight. The inner rabbets are relatively simple to effect with relatively few modifications while still using conventional features for providing improved performance, especially in the transient chop operation of the engine. Boltless blade retainers may now be used effectively in relatively low speed LPTs in accordance with the present invention while still maintaining effective concentricity between the retention plate and the disk during all modes of operation of the engine including transient chop. Where the blade retention plate also includes the cooling air feed holes which increase the extent of outer rabbet liftoff, the inner rabbet provides an effective but simple solution for maintaining concentricity.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A gas turbine engine rotor assembly comprising: a rotor disk including:
   a radially outer rim having a plurality of circumferentially spaced apart, axially extending dovetail slots;
   a radially inner hub;
   an annular web extending between said rim and hub; and
   an annular axial extension extending from said web and spaced radially below a corner of said rim to define a face cavity therebetween;
   a plurality of rotor blades each having a dovetail and an airfoil, with said blade dovetails being complementary to and axially disposed in respective ones of said dovetail slots for radially retaining said blades in said disk;
   an annular blade retention plate including:
      a radially outer rim abutting said disk rim and blade dovetails for axially retaining said blades in said disk;
      a radially inner hub disposed at least in part in said face cavity;
      a web extending radially between said plate rim and hub; and
   said plate hub having a radially outwardly facing outer rabbet disposed in abutting contact with said rim corner, and a radially inwardly facing inner rabbet spaced radially above said axial extension for maintaining abutting contact therewith upon differential radial contraction between said retention plate and disk which separates said outer rabbet from said rim corner; and
   means for axially locking said retention plate to said axial extension and permitting radial movement therebetween.

2. An assembly according to claim 1 wherein said outer rabbet abuts said rim corner in an interference fit, and said inner rabbet is spaced radially above said axial extension to define an initial predetermined clearance therebetween.

3. An assembly according to claim 2 wherein said clearance is lower in magnitude than said interference fit.

4. An assembly according to claim 2 wherein said locking means are configured for removably joining together said plate hub and said axial extension in a bayonet mount.

5. An assembly according to claim 2 wherein said locking means comprise a locking ring disposed between said retention plate and said axial extension for axially trapping said retention plate adjacent to said disk rim.

6. An assembly according to claim 5 wherein said plate web includes a plurality of circumferentially spaced apart feed holes for channeling cooling air into said disk rim for flow through said blade airfoils for cooling thereof.

7. An assembly according to claim 6 wherein said rotor disk has axially forward and aft sides, and said retention plate, rim corner, and axial extension are forward components disposed on said disk forward side.

8. An assembly according to claim 7 wherein said inner rabbet is disposed inboard of said outer rabbet, and said locking ring is disposed inboard of said plate web.

9. An assembly according to claim 7 wherein said inner rabbet is disposed outboard of said outer rabbet, and said locking ring is disposed outboard of said plate web.

10. An assembly according to claim 9 wherein said forward axial extension is radially flexible for attenuating transient loads with said forward retention plate during said differential radial contraction between said disk and said forward retention plate.

* * * * *

UNITED STATES PATENT AND TRADEMARK OFFICE
CERTIFICATE OF CORRECTION

PATENT NO.   : 5,622,475
DATED        : April 22, 1997
INVENTOR(S)  : Denis R. Hayner, et al It is certified that error appears in the above-indentified patent and that said Letters Patent is hereby corrected as shown below:

On the title page, under

"Related U.S. Application Data

[62] Division of Ser. No. 298,019, Aug. 30, 1994, abandoned"

Signed and Sealed this

Twenty-second Day of July, 1997

Attest:

Attesting Officer

BRUCE LEHMAN

Commissioner of Patents and Trademarks

UNITED STATES PATENT AND TRADEMARK OFFICE
CERTIFICATE OF CORRECTION

PATENT NO. : 5,622,475
DATED      : April 22, 1997
INVENTOR(S) : Denis R. Hayner, et al It is certified that error appears in the above-indentified patent and that said Letters Patent is hereby corrected as shown below:

On the title page, delete
"Related U.S. Application Data
[62] Division of Ser. No. 298,019, Aug. 30, 1994, abandoned"

This certificate supersedes Certificate of Correction issued July 22, 1997.

Signed and Sealed this

Twenty-fifth Day of November, 1997

Attest:

BRUCE LEHMAN

*Attesting Officer*  *Commissioner of Patents and Trademarks*